United States Patent [19]
Hirata

[11] Patent Number: 5,818,663
[45] Date of Patent: Oct. 6, 1998

[54] MAGNETIC HEAD SUSPENSION WITH GIMBAL HAVING INCREASED YAW RIGIDITY WITHOUT INCREASED PITCH OR ROLL RIGIDITY

[75] Inventor: Ichiro Hirata, Tokyo, Japan

[73] Assignee: NEC Corporation, Tokyo, Japan

[21] Appl. No.: 783,233

[22] Filed: Jan. 14, 1997

[30] Foreign Application Priority Data

Jan. 16, 1996 [JP] Japan ................................ 8-005090

[51] Int. Cl.$^6$ ........................................................ G11B 5/48
[52] U.S. Cl. ............................................................ 360/104
[58] Field of Search ..................................... 360/103, 104

[56] References Cited

U.S. PATENT DOCUMENTS

| | | | |
|---|---|---|---|
| 4,829,395 | 5/1989 | Coon et al. | 360/104 |
| 4,954,919 | 9/1990 | Yamada | 360/104 |
| 5,014,144 | 5/1991 | Sato et al. | 360/104 |
| 5,079,660 | 1/1992 | Yumura et al. | 360/104 |
| 5,367,419 | 11/1994 | Kazama | 360/104 |
| 5,386,331 | 1/1995 | Wolter | 360/104 |
| 5,625,514 | 4/1997 | Kubo et al. | 360/104 |
| 5,636,088 | 6/1997 | Yamamoto et al. | 360/104 |
| 5,657,188 | 8/1997 | Jurgenson et al. | 360/106 |

FOREIGN PATENT DOCUMENTS 63-83981  4/1988  Japan ................................... 360/104

*Primary Examiner*—Jefferson Evans
*Attorney, Agent, or Firm*—Young & Thompson

[57] ABSTRACT

A magnetic disk suspension having a gimbal comprising a head mounting section, a returning section, a slit, an arm section and load beam mounting section, wherein the position of a root section of the head mounting section is set so that the distance L between the root section of the head mounting section and the end part of the returning section satisfies the following formula when the distance between the end part of arm section in the side of the load beam mounting section and the front end part is defined as Lb and width of the arm section is defined as Wa, $$Wa < L \leq Wa + 0.15(Lb - Wa).$$

5 Claims, 4 Drawing Sheets

AMOUNT OF WIDTH INCREASE

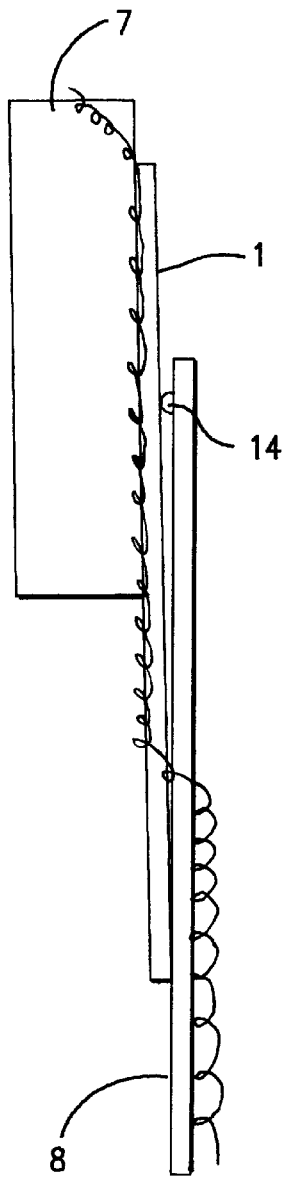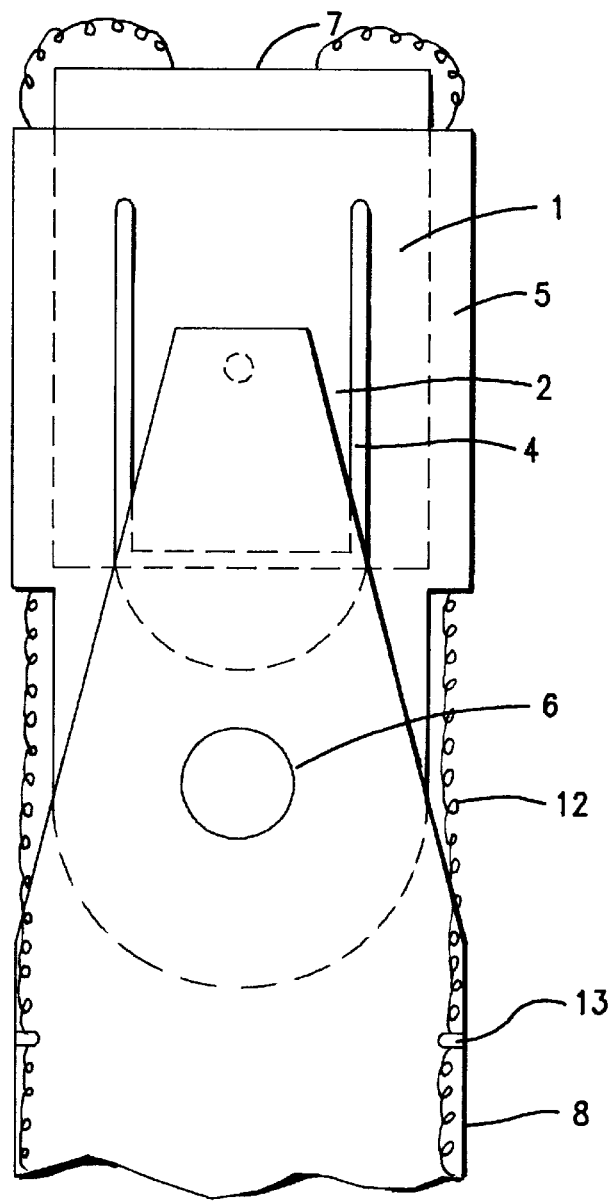
FIG. 5A
PRIOR ART
FIG. 5B
PRIOR ART

MAGNETIC HEAD SUSPENSION WITH GIMBAL HAVING INCREASED YAW RIGIDITY WITHOUT INCREASED PITCH OR ROLL RIGIDITY

BACKGROUND OF THE INVENTION

1. Field of the Invention

The present invention relates to a magnetic head suspension (hereinafter referred to as a suspension) and particularly to a suspension having only the yawing rigidity enhanced.

2. Description of the Related Art

FIG. 4 is a schematic plan view of a gimbal used in the related art.

In view of a need to prevent a head off-track problem generated when a gimbal head is relatively displaced, during the yawing operation, against an embossed section 14 of a load beam of FIG. 5A and is thereafter not returned to the initial position, both sides of the gimbal 1 are widened respectively by W'/2 to become equal to gimbal width W+W' to increase yawing rigidity in the gimbal 1 of the related art where distance L from the end part 3a of the returning section 3 of gimbal width W up to the root section 2a of the head mounting section 2 is equal to the width Wa of an arm section 5 as shown in FIG. 4. The returning section 3 is a section which includes root section 2a and end part 3a and a section enclosed by the root section 2a and the end part 3a.

FIG. 2 shows a schematic plan view of an ordinary magnetic disk drive. A suspension 9 is composed of a load beam 8, a gimbal 1 connected to the end section thereof and a slider 7 mounted to the head mounting section 2 of the gimbal 1. This slider 7 is provided with a head element for reading or writing data. Moreover, this suspension 9 is coupled to a holder arm 10 of an actuator. This slider 7 comprises a head element for reading and writing data. When the magnetic disk 11 rotates at a high speed, the slider 7 flies over the surface of the magnetic disk 11. In this magnetic disk drive, it is necessary, in view of preventing head off-track during access, to provide a high gimbal rigidity in the yawing direction (Y axis direction), while in view of following tracking characteristic of head, to suppress an increase of gimbal rigidity in both a rolling direction (around the X axis) and a pitching direction (around the Y axis).

The first problem is that since the yawing rigidity has been increased by extending the width of gimbal in the related art, rolling and pitching rigidity have been increased as well, lowering tracking ability of the head. This is because when the width of gimbal is widened, yawing rigidity are also increased due to the increase of cross-sectional area. However, but the rolling rigidity and pitching rigidity are also increased.

The second problem is that a lead wire of load beam is easily placed in contact with the gimbal. Therefore, it is probable that the lead wire may be broken and the wiring may be impeded during the assembling because the lead wire wired along the rail of the load beam is placed in contact with the gimbal when the width of gimbal is widened. As shown in FIGS. 5A and 5B, the gimbal is coupled to the load beam mounting section 6 and the load beam 8 press the slider 7 through an emboss section 14.

The positional relationship between the gimbal 1, load beam 8 and lead wire 12 when the width of gimbal 1 is widened is indicated in FIG. 5A and FIG. 5B. Since width of arm section 5 of gimbal 1 is wide, the lead wire 12 is arranged under the arm section 5 but the lead wire 12 is probably worn away as a result that the arm section 5 and lead wire 12 are frequently placed in contact and the lead wire 12 is also placed in contact with an edge due to the movement of the operating head.

SUMMARY OF THE INVENTION

It is therefore an object of the present invention to provide a suspension having a gimbal which has only a high yawing rigidity and does not result in the contact problem with the lead wire of load beam in order to attain high speed operation and improvement in reliability of the magnetic head.

The magnetic head suspension of the present invention comprises a head slider (hereinafter referred to as a slider) having an element to read and write data to and from a magnetic disk;

a gimbal for elastically supporting the slider to follow the change of attitude of the slider; and a load beam having the structure to hold the gimbal and to press the slider to the magnetic disk surface in the direction opposed to the floating direction against the floating force of the slider, wherein the load beam presses the slider through an emboss section located at the surface of the load beam, the gimbal is provided at its rear end section with the load beam mounting section to be fixed for the holding to the load beam.

A center area of the gimbal is provided with a head mounting section which is integrated at its one side with the returning section which is the front end side in the slider traveling direction of the gimbal and is isolated from the other part of the gimbal at the other sides, the slider being mounted on the head mounting section.

Both sides of the head mounting section are respectively provided with an arm section sandwiching the slit.

One end of the arm section is integrated with the load beam mounting section and the other end of the arm section is integrated with the returning section.

A position of a root section of the head mounting section is determined so that the distance L between the root section of the head mounting section and an end part of the returning section in the slider travelling direction satisfies the following formula where the distance from the one end of the arm to the end part of the returning section is Lb and width of the arm section is Wa, $$Wa < L \leq Wa + 0.15(Lb - Wa).$$

According to the simulation for stress analysis regarding the gimbal of the related art, the stress becomes highest during the seek operation at the area near the end part of slit 4 of the root section 2a of the head mounting section 2.

Moreover, according to the simulation result for stress analysis when a force is applied in both pitching and rolling directions, it is found that the stress becomes highest at the center area 5a (hatched area) of the arm section 5 shown in FIG. 6. The center area 5a of the arm section 5 gives the largest effect on the rolling rigidity and pitching rigidity and its length is about 70% of total length of arm section La. Judging from the results of these simulations, as far as the yawing rigidity is concerned, the effect similar to the case where the width is extended to compensate for the strength can be attained enough to increase the yawing rigidity can be expected by extending the distance L from the end part of the returning section 3 of the gimbal to the root section 2a of the head mounting section 2.

When the increase of distance L exceeds 15% of the distance Lb from the end part of the arm section 5 in the side of load beam mounting section 6 up to the front end part 3a, since the slit does not exist in the area where stress is centralized and becomes high, both rolling rigidity and pitching rigidity increase, while when the increase of distance L is within 15% of Lb, both rolling rigidity and pitching rigidity do not increase. Namely, it has been found that when the increase of distance L is set within 15% of the distance Lb, rolling rigidity and pitching rigidity are not increased.

In other words, it can be understood that the slit should not be provided at the left side area of the region indicated as the center area 5a of the arm section 5 in FIG. 6.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein;

FIG. 3A is a graph indicating the yawing rigidity when the root section 2a of the head mounting section in the embodiment of the present invention is moved;

FIG. 3B is a graph indicting the yawing rigidity when the width W of gimbal of the related art is extended;

FIG. 3C is a graph indicating the rolling rigidity when the root section 2a of the head mounting section in the embodiment of the present invention is moved;

FIG. 3D is a graph indicating the rolling rigidity when the width W of gimbal of the related art is extended;

FIG. 3E is a graph indicating the pitching rigidity when the root section 2a of the head mounting section in the embodiment of the present invention is moved;

FIG. 3F is a graph indicating the pitching rigidity when the width W of gimbal of the related art is extended;

FIG. 5A is a schematic side elevation of a magnetic head suspension of the related art;

FIG. 5B is a schematic plan view of a magnetic head suspension of the related art;

DESCRIPTION OF THE PREFERRED EMBODIMENT

A preferred embodiment of the present invention will be explained with reference to the accompanying drawings.

Figure 1:
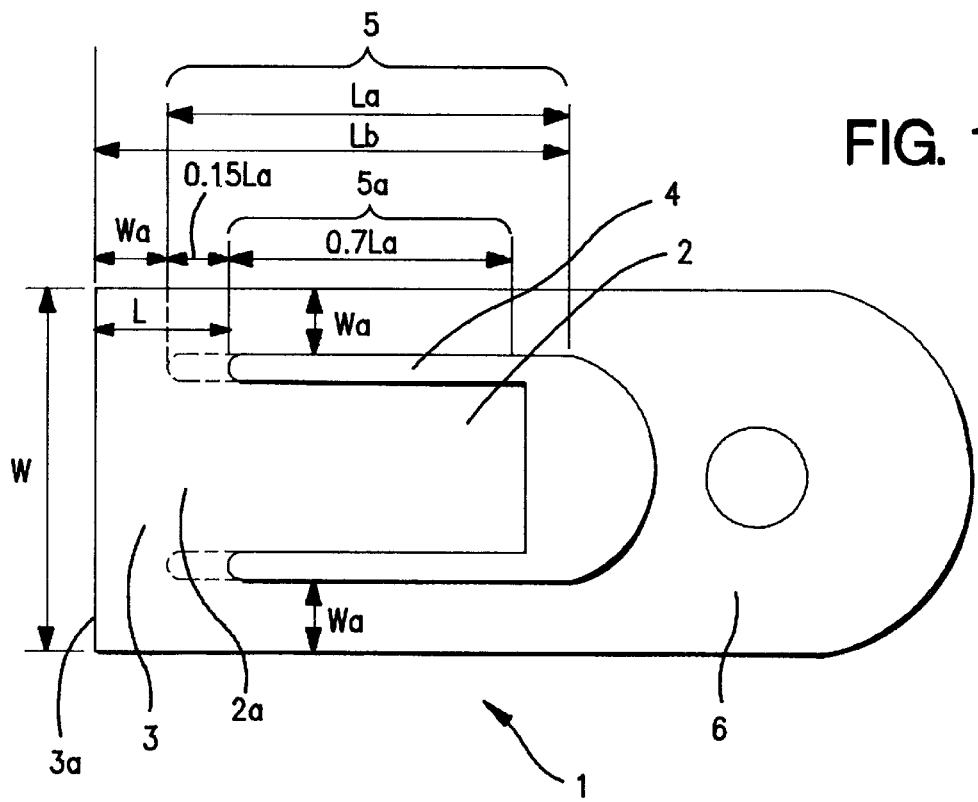
FIG. 1 is a schematic plan view of a gimbal forming the structure of an embodiment of the magnetic head suspension of the present invention.
Figure 2:
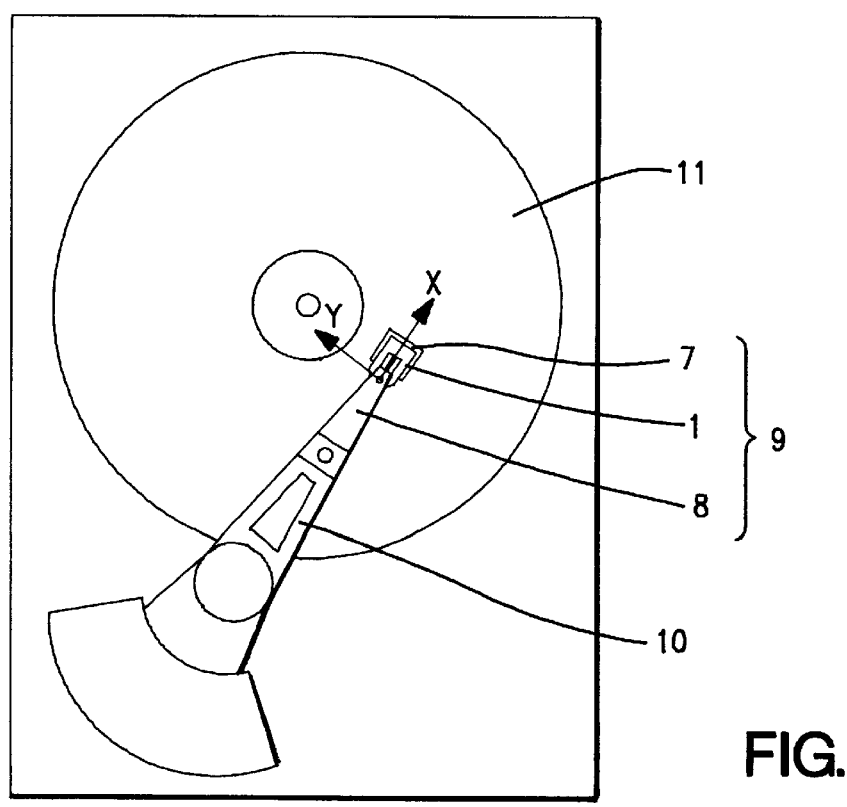
FIG. 2 is a schematic plan view of an ordinary magnetic disk drive.

FIG. 1 is a schematic plan view of a gimbal forming an embodiment of a magnetic head suspension of the present invention, FIG. 2 is a schematic diagram of an ordinary magnetic disk drive and FIGS. 3A to 3F are graphs as a result of simulation indicating various characteristics of an embodiment of the present invention.

As shown in FIG. 1, in the gimbal 1 in the width W, the root section 2a of the head mounting section 2 is located in the distance L from the end part 3a of the returning section 3 of the gimbal 1 and arm sections 5 are formed in both sides of the head mounting section 2 via the slit 4. In this gimbal 1, the distance L from the end part 3a of the returning section 3 of gimbal 1 to the root section 2a of the head mounting section 2 is increased from the conventional L=Wa (shown by the dotted lines in FIG. 1) within the range of Wa<L ≦Wa+0.15(Lb−Wa) where the distance from the end part of the arm section 5 in the side of the load beam mounting section 6 to the end part 3a is defined as Lb.

FIG. 2 shows the magnetic disk drive providing such gimbal 1 but it is not explained here because it is similar to the related art explained above.

In this embodiment, since the root section 2a of the head mounting section 2 is located as explained above, any influence is applied to the rolling rigidity and pitching rigidity and the yawing rigidity can be increased without changing the width W.

According to the present invention, when the root section 2a is moved by 0.28 mm (<0.3 mm) in the direction to the load beam mounting section 6 in regard to the gimbal where plate thickness is 30 μm, width W is 1.6 mm, distance L is 0.35 μm, width Wa is 0.35 μm, total length of La is 0.2 mm and the material is SUS304, the yawing rigidity can be increased by 92% without increase of the rolling rigidity and pitching rigidity.

Next, operation of the embodiment of the present invention will be explained in detail with reference to FIG. 3.

FIG. 3 shows the graphs of FIG. 3A to FIG. 3F indicating the results of simulations for yawing, rolling and pitching rigidity when the root section 2a of the head mounting section of the present invention is shifted and when width W of the gimbal of the related art is extended.

Figure 3A:
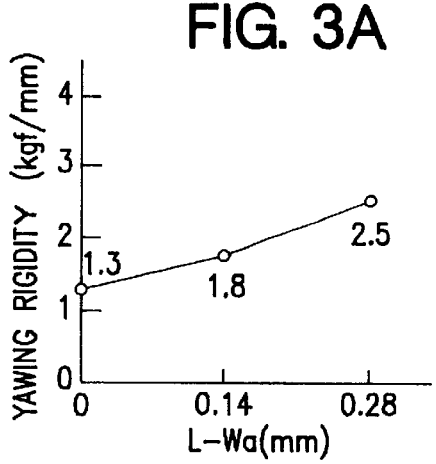
FIGS. 3A to 3F are graphs indicating the result of simulation to show various operation characteristics of the preferred embodiment of the present invention.
Figure 3B:
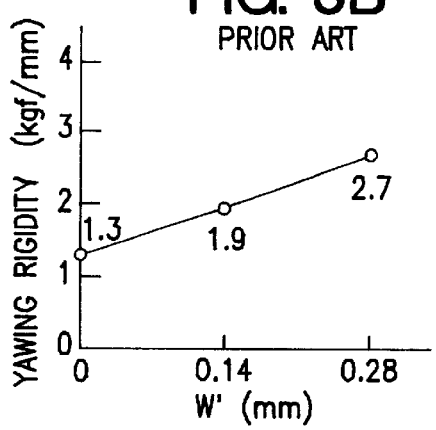

When movement of the root section is set equal to increase of the width, the increase of yawing rigidity tends to become equal in the level in FIG. 3A and FIG. 3B. Namely, when movement is 0.28 mm, the yawing rigidity is increased, in comparison with that before the movement, by about 92% from 1.3 kgf/mm to 2.5 kgf/mm as shown in FIG. 3A, reflecting sufficient effect.

Figure 3C:
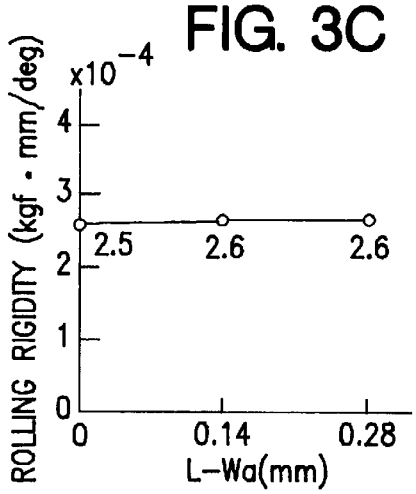
Figure 3D:
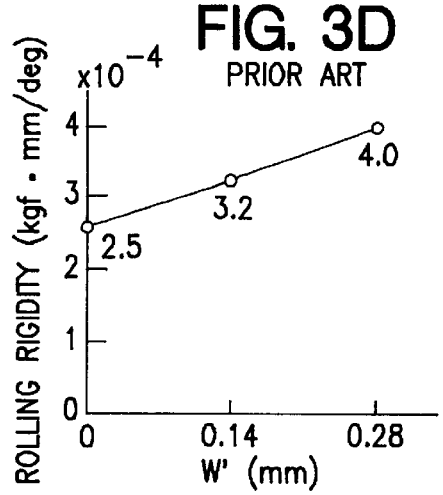
Figure 3E:
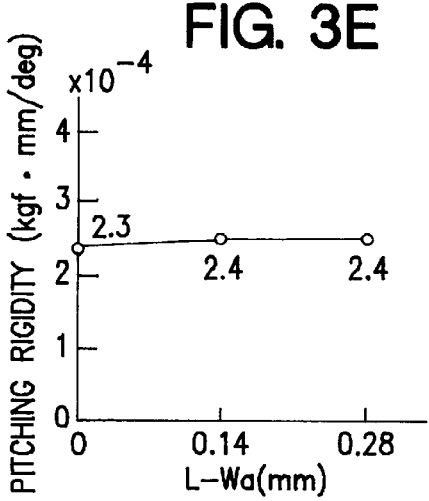
Figure 3F:
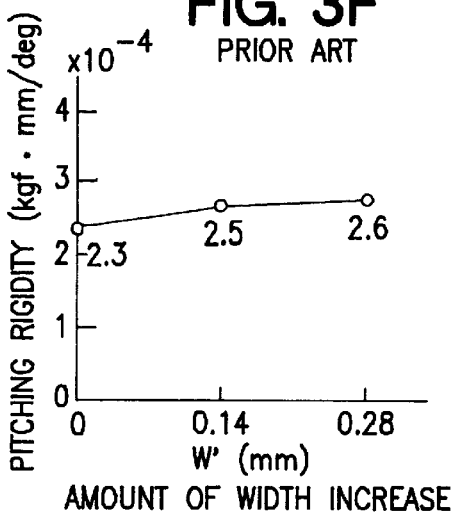
Figure 4:
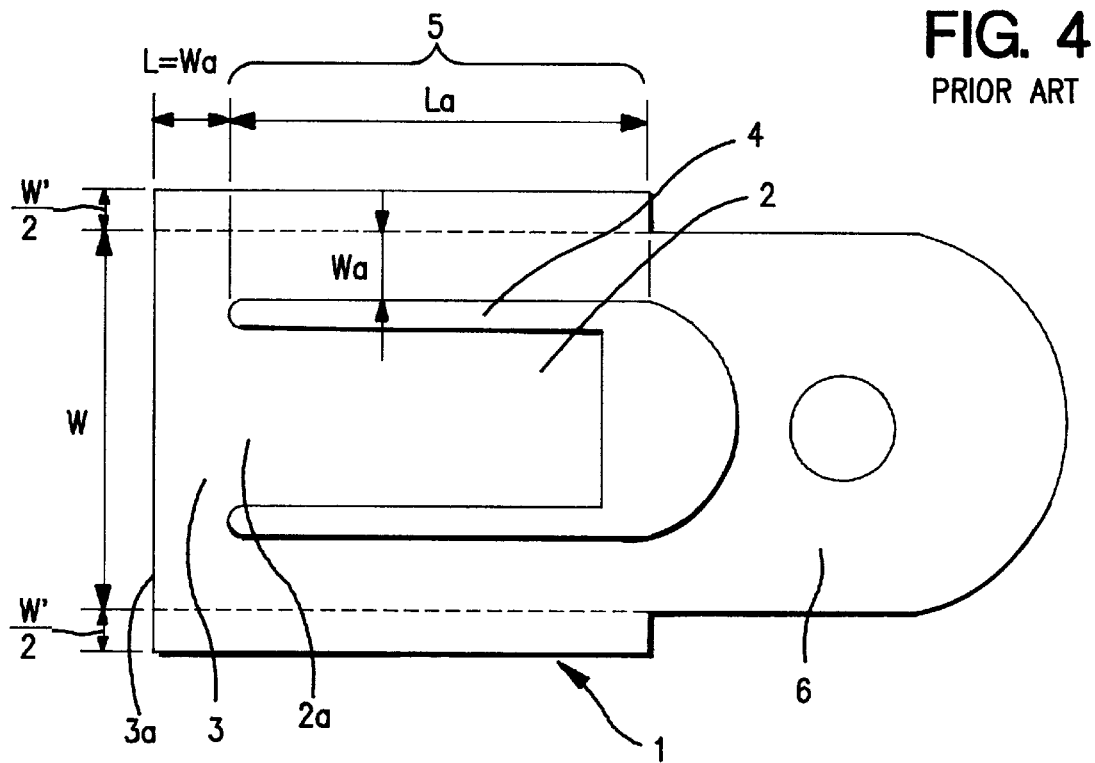
FIG. 4 is a schematic plan view of a gimbal of the related art.
Figure 6:
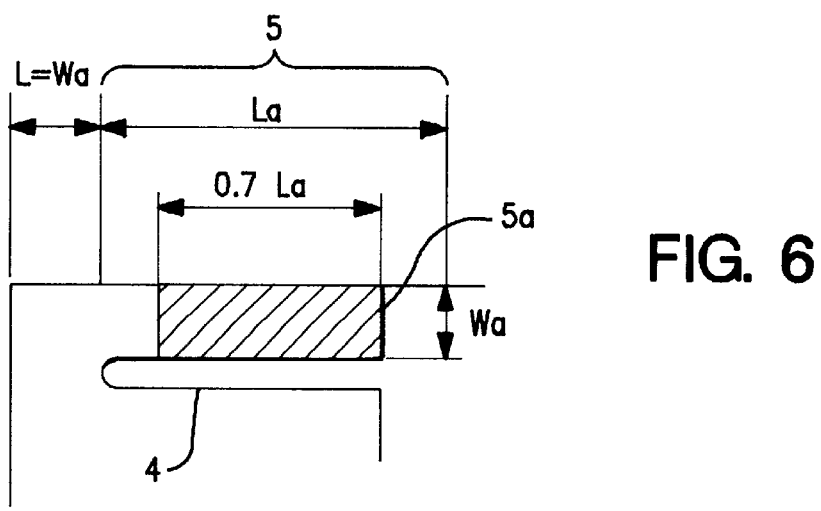
FIG. 6 is a plan view indicating the area where stress is high in such a case that force is added in the pitching and rolling directions among the arm section of gimbal of the related art.

Meanwhile, in the present invention where the root section 2a is moved at the area before the center area 5a, the rolling rigidity is almost remained unchanged as shown FIG. 3C, but in the method of related art where the width is increased by 0.28 mm, the rolling rigidity is increased by up to 60% as shown in FIG. 3D. Considering the pitching rigidity, it is increased when the width is increased, even a little, more than when the root section 2a is moved as shown in FIG. 3E and FIG. 3F.

From the results of the above the simulations, it is proved that only the yawing rigidity can be increased by the present invention where the width Wa of the center area 5a of the arm which gives an influence on the rolling and pitching rigidity is left unchanged and the position of root section 2a of the head mounting section 2 is moved in the area before the center area in the direction of the load beam mounting section.

When the suspension of the present invention is comprised in the magnetic disk apparatus, since it is required to use a metal material having excellent corrosion resistance and rather higher rigidity as a material of suspension, SUS 304 which is the Austenite-based stainless steel can be used.

As explained above, the present invention provides the effect of offering a magnetic head suspension which assures only a high yawing rigidity and no fear of interference with a lead wire of the load beam by limiting the range of setting position of the root section of the head mounting section without increasing the width of gimbal.

While the present invention has been described with reference to illustrative embodiments, this description is not intended to be construed in a limiting sense. Various modifications of the illustrative embodiments, as well as other embodiments of the invention, will be apparent to persons skilled in the art upon reference to this description. It is, therefore, contemplated that the appended claims will cover any such modifications or embodiments as fall within the true scope of the invention.

What is claimed is:

1. A magnetic head suspension comprising:
   a head slider (hereinafter referred to as a slider) having an element to read and write data to and from a magnetic disk;
   a gimbal for elastically supporting said slider to follow the change of attitude of said slider; and
   a load beam having the structure to hold said gimbal and to press said slider to the magnetic disk surface in the direction opposed to the floating direction against the floating force of said slider,
   wherein said load beam presses said slider through an emboss section located at the surface of said load beam,
   said gimbal is provided at its rear end section with the load beam mounting section to be fixed for the holding to said load beam,
   a center area of said gimbal is provided with a head mounting section which is integrated at its one side with the returning section which is the front end side in said slider traveling direction of said gimbal and is isolated from the other part of said gimbal at the other sides, said slider being mounted on said head mounting section,
   both sides of said head mounting section are respectively provided with an arm section sandwiching a slit,
   one end of said arm section is integrated with said load beam mounting section and the other end of said arm section is integrated with the returning section, and
   a position of a root section of said head mounting section is determined so that the distance L between the root section of said head mounting section and an end part of said returning section in said slider travelling direction satisfies the following formula where the distance from said one end of said arm to said end part of said returning section is Lb and width of said arm section is Wa, $$Wa < L \leq Wa + 0.15(Lb - Wa).$$

2. A magnetic head suspension as claimed in claim 1, wherein an Austenite-based steel is used as a material of said gimbal.

3. A magnetic disk apparatus comprising a magnetic disk suspension claimed of claim 1.

4. A magnetic head suspension comprising:
   a head slider;
   a gimbal for elastically supporting said head slider; and
   a load beam to hold said gimbal, said gimbal comprising:
      a rear section comprising a load beam mounting section fixed to said load beam,
      a returning section comprising an end part located at an end of said gimbal opposite said load beam mounting section,
      a center section comprising a head mounting section for mounting said head slider, said head mounting section comprising a root section adjacent said returning section, and further comprising first, second, and third sides isolated from said gimbal,
      first and second slits located adjacent said first and second sides of said head mounting section respectively,
      first and second arm sections, of width Wa, located adjacent said first and second slits respectively, said first and second arm sections each comprising first ends integrated with said load beam mounting section at a distance Lb from said end part, and second ends integrated with said returning section,
   wherein said root section is located a distance L from said end part as defined by the formula:

$$Wa < L \leq Wa + 0.15(Lb - Wa).$$

5. A magnetic head suspension gimbal, comprising:
   a load beam mounting section for attachment to a load beam;
   a returning section comprising a free end located at an end of said gimbal opposite said load beam mounting section;
   a head mounting section for mounting a head slider, said head mounting section comprising a root section adjacent said returning section, and further comprising first, second, and third sides isolated from said gimbal;
   first and second slits located adjacent said first and second sides respectively;
   first and second arm sections, located adjacent said first and second slits respectively, said first and second arm sections each having width Wa and comprising first ends adjoining said load beam mounting section at a distance Lb from said end part, and second ends adjoining said returning section,
   wherein said root section is located a distance L from said end part as defined by the relationship:

$$Wa < L \leq Wa + 0.15(Lb - Wa).$$

* * * * *